US011885290B2

(12) United States Patent
John et al.

(10) Patent No.: US 11,885,290 B2
(45) Date of Patent: Jan. 30, 2024

(54) FUEL INJECTOR AND NOZZLE ASSEMBLY HAVING DUAL CONCENTRIC CHECK ASSEMBLY AND DUCTED SPRAY ORIFICES

(71) Applicant: Caterpillar Inc., Peoria, IL (US)

(72) Inventors: Bobby John, Peoria, IL (US); Jonathan William Anders, Peoria, IL (US); Glen Clifford Martin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 266 days.

(21) Appl. No.: 17/014,154

(22) Filed: Sep. 8, 2020

(65) Prior Publication Data

US 2022/0074378 A1 Mar. 10, 2022

(51) Int. Cl.
*F02M 61/18* (2006.01)
*F02M 61/04* (2006.01)

(52) U.S. Cl.
CPC ...... *F02M 61/1826* (2013.01); *F02M 61/042* (2013.01); *F02M 61/1846* (2013.01); *F02M 2700/071* (2013.01)

(58) Field of Classification Search
CPC ............. F02M 61/1826; F02M 61/042; F02M 61/1846; F02M 2700/071
USPC ...................................................... 239/533.12
See application file for complete search history.

(56) References Cited

U.S. PATENT DOCUMENTS

| | | | | |
|---|---|---|---|---|
| 5,072,706 A | 12/1991 | Eblen et al. | | |
| 6,422,199 B1 | 7/2002 | Buckley et al. | | |
| 7,556,017 B2 | 7/2009 | Gibson | | |
| 8,967,129 B2 * | 3/2015 | Mueller | F02F 3/24 | 123/298 |
| 9,453,483 B2 | 9/2016 | Kim | | |
| 9,957,939 B2 | 5/2018 | Mahato et al. | | |
| 9,964,088 B2 | 5/2018 | Zhang | | |
| 10,012,196 B1 | 7/2018 | Qi et al. | | |
| 10,151,235 B2 | 12/2018 | Anders et al. | | |
| 10,570,865 B2 | 2/2020 | Zhang | | |

(Continued)

FOREIGN PATENT DOCUMENTS

| | | |
|---|---|---|
| GB | 2003550 B | 10/1982 |
| GB | 2348247 B | 2/2003 |
| WO | 03078824 A1 | 9/2003 |

OTHER PUBLICATIONS

Bobby John, Specification and Drawings for U.S. Appl. No. 16/531,826 Fuel System, Fuel Injector Nozzle Assembly, and Engine Head Assembly Structured for Ducted Fuel Injection, filed Aug. 5, 2019.

*Primary Examiner* — Chee-Chong Lee
(74) *Attorney, Agent, or Firm* — Brannon Sowers & Cracraft PC

(57) ABSTRACT

A fuel injector includes a nozzle assembly having a nozzle case, and a concentric check assembly within the nozzle case. Transfer passages are formed in an outer check of the check assembly, and spray orifices are formed in the nozzle case. A fuel volume is formed between the outer check and an inner check, and the inner check is movable to fluidly connect the transfer passages to the fuel volume. The outer check is rotatable between a first angular orientation and a second angular orientation to fluidly connect separate sets of the transfer passages to separate sets of the spray orifices. Spray ducts are in spray path alignment with at least one of the sets of spray orifices.

14 Claims, 7 Drawing Sheets

(56) References Cited

U.S. PATENT DOCUMENTS

| | | | | |
|---|---|---|---|---|
| 2016/0298528 | A1* | 10/2016 | Svensson ............ | F02B 23/0651 |
| 2016/0298529 | A1* | 10/2016 | Anders ................... | F02B 23/02 |
| 2016/0298584 | A1* | 10/2016 | Svensson ............ | F02B 23/0627 |
| 2019/0195183 | A1 | 6/2019 | Hashizume | |
| 2020/0003167 | A1 | 1/2020 | Tavernier | |

* cited by examiner

FUEL INJECTOR AND NOZZLE ASSEMBLY HAVING DUAL CONCENTRIC CHECK ASSEMBLY AND DUCTED SPRAY ORIFICES

TECHNICAL FIELD

The present disclosure relates generally to ducted fuel injection in an internal combustion engine, and more particularly to a fuel injector nozzle assembly having a concentric check assembly positionable at different angular orientations to selectively inject fuel through spray orifices having different ducted characteristics.

BACKGROUND

Modern internal combustion engines include one or more cylinders each with an associated piston to define a combustion chamber. Fuel for combustion is delivered into the combustion chamber by, for example, directly injecting the fuel using a fuel injector. Such fuel injectors have at least one and typically several spray orifices, the opening and closing of which is controlled by way of an electrically or hydraulically actuated outlet check.

Varying fuel and air mixtures, different fuel delivery parameters, equivalence ratios and other factors can produce a range of results during combustion. Certain constituents in exhaust from an internal combustion engine are often filtered, chemically reduced, or otherwise treated to limit discharge of those constituents to the environment. In recent years there has been great interest in controlling and/or managing the manner and mechanisms of combustion in an effort to control the exhaust emissions profile of internal combustion engines. Notable amongst the emissions it is generally desirable to limit are particulate matter and oxides of nitrogen or "NOx."

Ducted fuel injection assemblies have been implemented in internal combustion engines to enhance mixing and reduce the amount of particulate matter, namely, soot, formed within the combustion chamber. Ducted assemblies typically include one or more tubular structures coupled to the cylinder head in the engine and positioned such that the ducts receive fuel spray jets from the fuel injector. The fuel spray tends to interact with the ducts, to ultimately enhance mixing of the fuel with air, in particular by increasing the so-called "liftoff length" of the fuel spray jets to enable air to mix with the plumes of fuel.

One known ducted fuel injection application is set forth in U.S. Pat. No. 10,012,196B1 and entitled Duct Structure for Fuel Injector Assembly. While known ducted fuel injection techniques show promise for widespread application, there is always room for improvement and alternative strategies.

SUMMARY OF THE INVENTION

In one aspect, a fuel injector includes a nozzle case defining a longitudinal axis, and having spray orifices formed therein arranged in a first orifice set and a second orifice set. The fuel injector further includes spray ducts coupled to the nozzle case and in spray path alignment with the first orifice set. The fuel injector further includes an outer check positioned within the nozzle case and having transfer passages formed therein arranged in a first passage set and a second passage set, and the outer check being rotatable about the longitudinal axis relative to the nozzle case. The fuel injector further includes an inner check positioned within the outer check and movable relative to the outer check between a retracted position and an advanced position. A fuel volume is formed between the outer check and the inner check, and at the retracted position the transfer passages are fluidly connected to the fuel volume. At the advanced position the inner check is in contact with the outer check and blocks the transfer passages from the fuel volume. The spray orifices and the transfer passages together define a first angular alignment pattern where the outer check is at a first angular orientation about the longitudinal axis and the first orifice set is fluidly connected to the first passage set. The spray orifices and the transfer passages together define a second angular alignment pattern where the outer check is rotated from the first angular orientation to a second angular orientation and the second orifice set is fluidly connected to the second passage set.

In another aspect, a method of operating a fuel injector includes rotating an outer check in the fuel injector to a first angular orientation about a longitudinal axis where a first set of transfer passages in the outer check are fluidly connected to a first set of spray orifices in a nozzle case of the fuel injector. The method further includes retracting an inner check in the fuel injector to fluidly connect the first set of transfer passages to a fuel volume formed between the outer check and the inner check, and spraying fuel from the fuel injector through the first set of spray orifices and a set of spray ducts in spray path alignment with the first set of spray orifices based on the fluidly connecting of the first set of transfer passages to the fuel volume. The method further includes rotating the outer check to a second angular orientation where a second set of transfer passages in the outer check are fluidly connected to a second set of spray orifices in the nozzle case. The method still further includes retracting the inner check to fluidly connect the second set of transfer passages to the fuel volume, and spraying fuel from the fuel injector through the second set of spray orifices based on the fluidly connecting of the second set of transfer passages to the fuel volume.

In still another aspect, a fuel injector nozzle assembly includes a nozzle case defining a longitudinal axis and having an outer nozzle surface and an inner nozzle surface. The nozzle assembly further includes a concentric check assembly within the nozzle case and including an inner check, and an outer check having an outer check surface in contact with the inner nozzle surface and an inner check surface in contact with the inner check. A plurality of transfer passages are formed in the outer check and extend between the outer check surface and the inner check surface. A plurality of spray orifices are formed in the nozzle case and extend between the outer nozzle surface and the inner nozzle surface. A fuel volume is formed between the outer check and the inner check. The inner check is movable relative to the outer check to a retracted position out of contact with the inner check surface where the transfer passages are fluidly connected to the fuel volume. The outer check is rotatable about the longitudinal axis relative to the nozzle case between a first angular orientation where a first set of the transfer passages are fluidly connected to a first set of the spray orifices, and a second angular orientation where a second set of the transfer passages are fluidly connected to a second set of the spray orifices. The nozzle assembly further includes a first set of spray ducts in spray path alignment with the first set of spray orifices, and a second set of spray ducts in spray path alignment with the second set of spray orifices.

DETAILED DESCRIPTION

Figure 1:
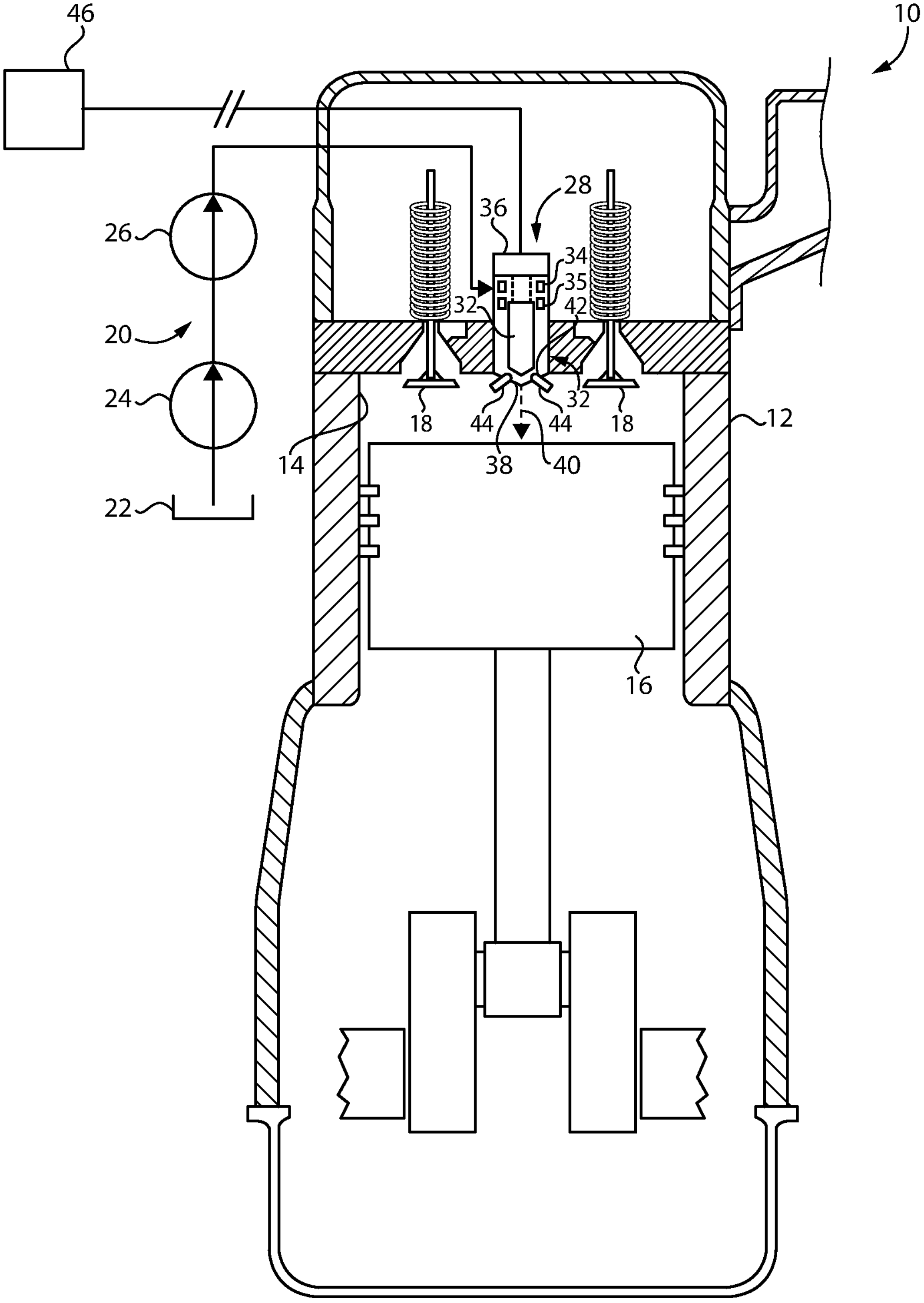
FIG. 1 is a partially sectioned diagrammatic view of an internal combustion engine, according to one embodiment.

Referring to FIG. 1, there is shown an internal combustion engine 10, according to one embodiment. Internal combustion engine 10 includes an engine housing 12 having a combustion cylinder 14 formed therein. Combustion cylinder 14 may be one of any number of cylinders in any suitable arrangement. A piston 16 is positioned within cylinder 14 and movable between a top dead center position and a bottom dead center position, in a generally conventional manner. Internal combustion engine 10 may be compression-ignited and structured to operate using a liquid fuel such as a liquid diesel distillate fuel. Engine valves 18, including exhaust valves, intake valves, or one of each, are structured to fluidly connect combustion cylinder 14 with an exhaust manifold and an intake manifold also in a generally conventional manner. Internal combustion engine 10 further includes a fuel system 20 having a fuel tank 22, and in the illustrated embodiment a low pressure transfer pump 24 and a high pressure pump 26 structured to pressurize a fuel for injection into combustion cylinder 14 by way of a fuel injector 28. An electronic control unit 46, including any suitable central processing unit, is structured to electrically actuate components of fuel injector 28 for controlling a timing and manner of fuel injection as further discussed herein. Fuel system 20 could include any suitable fuel supply and pressurization system, including a common rail or other pressurized fuel reservoir, a unit pump pressurizing fuel to an injection pressure for an individual fuel injector, hydraulically actuated fuel pressurization, mechanically actuated fuel pressurization, as well as combinations and variations of these.

Fuel injector 28 is positioned for direct injection of pressurized fuel into combustion cylinder 14 and includes a nozzle case 38 defining a longitudinal axis 40, and having spray orifices 42 formed therein. Spray ducts 44 are coupled to nozzle case 38 and in spray path alignment with spray orifices 42. A concentric check assembly 32 is positioned within nozzle case 38. Concentric check assembly 32 may include an inner check and an outer check, with the outer check rotatable relative to nozzle case 38 about longitudinal axis 40, as further discussed herein. A first solenoid actuator 34 may be resident in or coupled to fuel injector 28 and structured to actuate the inner check in concentric check assembly 32. A second solenoid actuator 35 may be resident in or attached to fuel injector 28 and structured to actuate the outer check in concentric check assembly 32. A rotator 36 may be resident in or attached to fuel injector 28 and structured to rotate the outer check in concentric check assembly 32. Any suitable electrical or mechanical actuator mechanism(s) may be used for operating concentric check assembly 32 in a manner and for purposes which will be further apparent from the following description.

Figure 2:
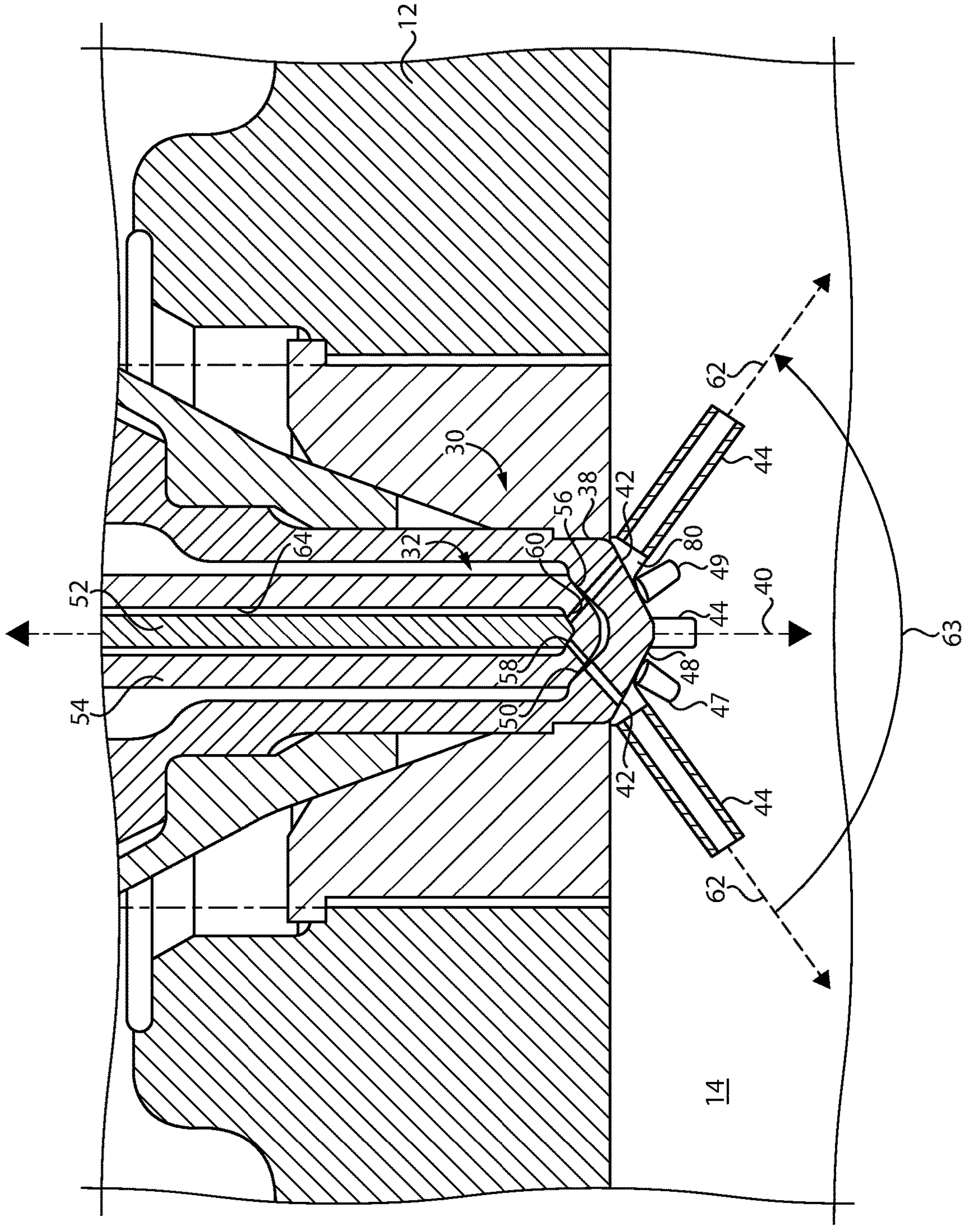
FIG. 2 is a sectioned diagrammatic view through a portion of the engine of FIG. 1.

Referring also now to FIG. 2, nozzle case 38 includes an outer nozzle surface 48 and an inner nozzle surface 50. Concentric check assembly 32 is positioned within nozzle case 38 and includes an inner check 52, and an outer check 54 having an outer check surface 56 in contact with inner nozzle surface 50 and an inner check surface 58 in contact with inner check 52. A plurality of transfer passages 60 are formed in outer check 54 and extend between outer check surface 56 and inner check surface 58. A plurality of spray orifices 42 are formed in nozzle case 38 as noted above, and extend between outer nozzle surface 48 and inner nozzle surface 50. A fuel volume 64 is formed between outer check 54 and inner check 52. Inner check 52 is movable relative to outer check 54 from an advanced position, as depicted in FIG. 2, to a retracted position out of contact with inner check surface 58, where transfer passages 60 are fluidly connected to fuel volume 64. Transfer passages formed in outer check 54 may be arranged in a first set including transfer passages 60, as shown in FIG. 2, and one or more additional sets of transfer passages hereinafter described. Spray orifices in nozzle case 38 are arranged in a first set including spray orifices 42, shown in FIG. 1 and FIG. 2, and additional sets as hereinafter described. Spray ducts 44 are in spray path alignment with spray orifices 42. Spray path alignment means that fuel spray paths exiting nozzle case 38 are oriented such that an axis of the spray path enters the spray ducts. Spray paths 62 as might be defined by spray jets of fuel exiting spray ducts 44 are shown in FIG. 2. A second set of spray ducts 47 in spray path alignment with a second set of spray orifices, and a third set of spray ducts 49 in spray path alignment with a third set of spray orifices, are depicted behind the plane of the page in FIG. 2.

Figure 3:
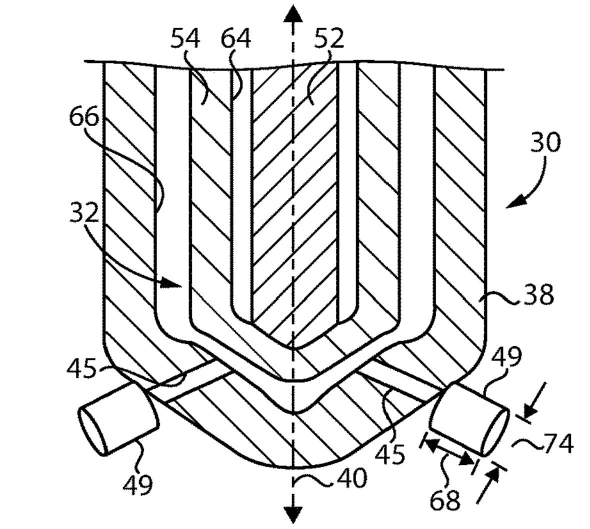
FIG. 3 is a sectioned side diagrammatic view of a fuel injector nozzle assembly in one configuration.
Figure 4:
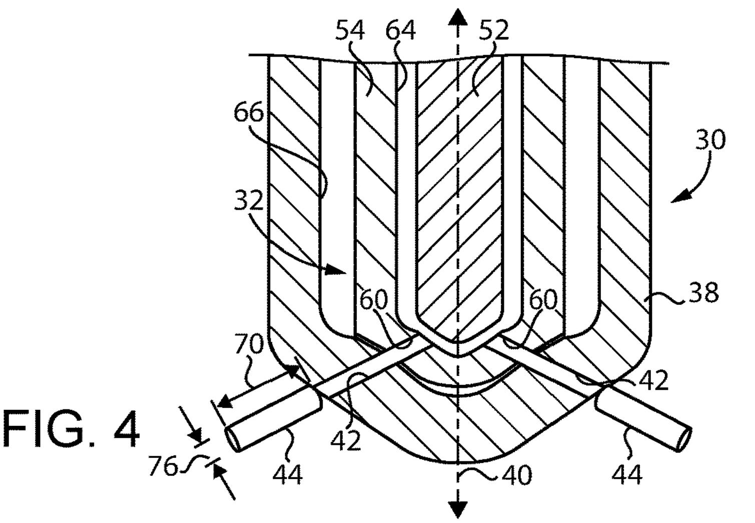
FIG. 4 is a sectioned side diagrammatic view of the fuel injector nozzle assembly of FIG. 3 in another configuration.
Figure 5:
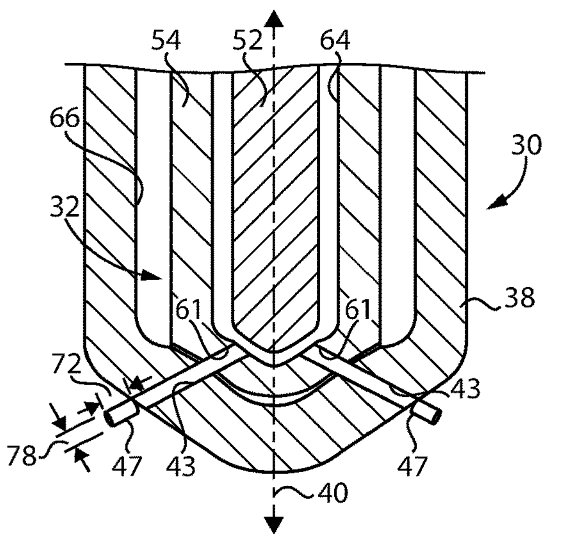
FIG. 5 is a sectioned side diagrammatic view of the fuel injector nozzle assembly of FIGS. 3 and 4 in yet another configuration.

Outer check 54 is rotatable about longitudinal axis 40 relative to nozzle case 38 between a first angular orientation where a first set of transfer passages, for instance transfer passages 60, are fluidly connected to a first set of spray orifices, for instance spray orifices 42, and a second angular orientation where a second set of transfer passages are fluidly connected to a second set of spray orifices. Referring also now to FIGS. 3-5, there is shown nozzle assembly 30 in three different configurations illustrating several available alternative fluid connections amongst transfer passages and spray orifices. In FIG. 4, concentric check assembly 32 is shown at the same angular orientation as in FIG. 2, and inner check 52 has been moved to a retracted position such that fuel volume 64 is fluidly connected to transfer passages 60, in turn fluidly connected to spray orifices 42 to spray fuel from fuel injector 28 through spray orifices 42 and through spray ducts 44. In FIG. 5, outer check 54 has been rotated to a second angular orientation where a second set of transfer passages 61 are fluidly connected to a second set of spray orifices 43. Inner check 52 has been moved to a retracted position and fuel volume 64 provides a flow of fuel through transfer passages 61 to be injected from fuel injector 28 through spray orifices 43 and through spray ducts 47.

In the embodiment illustrated a second fuel volume 66 is formed between nozzle case 38 and outer check 54. In FIG. 3 a third set of spray orifices 45 formed in nozzle case 38 and in spray path alignment with spray ducts 49 are fluidly connected to second fuel volume 66 to provide a flow of fuel to spray orifices 45 for injection through spray ducts 49. As can be seen from FIG. 3, outer check 54 is movable relative to nozzle case 38 to a retracted position out of contact with inner nozzle surface 50 such that second fuel volume 66 is fluidly connected to third set of spray orifices 45. In the configuration shown second fuel volume 66 is also fluidly connected to second set of spray orifices 43 and fluidly connected to first set of spray orifices 42. From the foregoing description it will be appreciated that rotation of outer check 54 in the manner described enables spray orifices 42 and 43, together with transfer passages 60 and 61, to define a first angular alignment pattern where outer check 54 is at a first angular orientation about longitudinal axis 40 and first orifice set 42 is fluidly connected to first transfer passage set 60. Rotation of outer check 54 also enables spray orifices 42 and 43 together with transfer passages 60 and 61 to define a second angular alignment pattern where outer check 54 is rotated from the first angular orientation, as in FIG. 4, to a second angular orientation, as in FIG. 5, where second orifice set 43 is fluidly connected to second transfer passage set 61. In an embodiment, second transfer passage set 61 is blocked from second orifice set 43 in the first angular alignment pattern, and first passage set 60 is blocked from first orifice set 42 in the second angular alignment pattern. In the configuration shown in FIG. 3, inner check 42 is at its advanced position to block all of transfer passages 60 and 61 from fuel volume 64, and second fuel volume 66 is fluidly connected to all of spray orifices 42, 43, and 45. Third orifice set 45 may be blocked from fuel volume 64 in both the first angular alignment pattern and the second angular alignment pattern discussed herein. It should further be appreciated that the terms first, second, third, and like terms should not be understood to require that any particular configuration, ordering, or feature is intended, in other words, a "first" set of transfer passages might be considered a "second" set of transfer passages, or a "third" set, depending upon perspective.

In some instances, it may be desirable to inject fuel at different injection pressures, different injection amounts, at different spray angles, or according to various other differing spray properties. For example, relatively larger spray ducts might be desired for instances where larger fuel injection amounts in a given engine cycle are desired, versus relatively smaller spray ducts where lesser fuel injection amounts are desired. Spray jet shape, spray angle, penetration, effective lift-off length provided by spray ducts, and still other properties can be varied by varying the geometry and/or arrangement of the spray ducts. In FIG. 4 spray ducts 44 are shown having a first duct length 70 and a first duct width 76. Spray ducts 47 are shown having a second duct length 72 and a second duct width 78. Spray ducts 49 are shown having a third duct length 68 and a third duct width 74. It can be noted duct length 70 is longer than duct length 49, and duct length 49 is longer than duct length 72. Duct width 74 is wider than duct width 76, which in turn is wider than duct width 78. Returning to FIG. 2, there is shown a spray angle 63 formed between spray paths 62 from spray ducts 44. It can also be noted that spray ducts 44 are generally cylindrical, including a straight cylindrical internal profile. In alternatives, an inner shape of ducts spray 44, or any other spray ducts in nozzle assembly 30, might be tapered so as to narrow in directions away from nozzle assembly 30, to broaden in directions away from nozzle assembly 30, or to have still other geometric, proportional, or shape attributes.

A first set of spray ducts, a second set of spray ducts, a third set of spray ducts, and potentially still others, including any of spray ducts 44, 47, or 49 may differ from one another in at least one of duct number, duct length, duct width, duct shape, or spray angle. It should also be appreciated that some spray orifices in a fuel injector nozzle assembly according to the present disclosure may not be equipped with spray ducts at all, in other words unducted. In FIG. 2 a duct holding structure 80 is shown attached to nozzle case 38 and supports the respective sets of spray ducts at their desired spray path alignment orientations relative to the respective spray orifices. In other embodiments, a duct holding structure might be attached to an engine head receiving nozzle assembly 30, for example.

Figure 6:
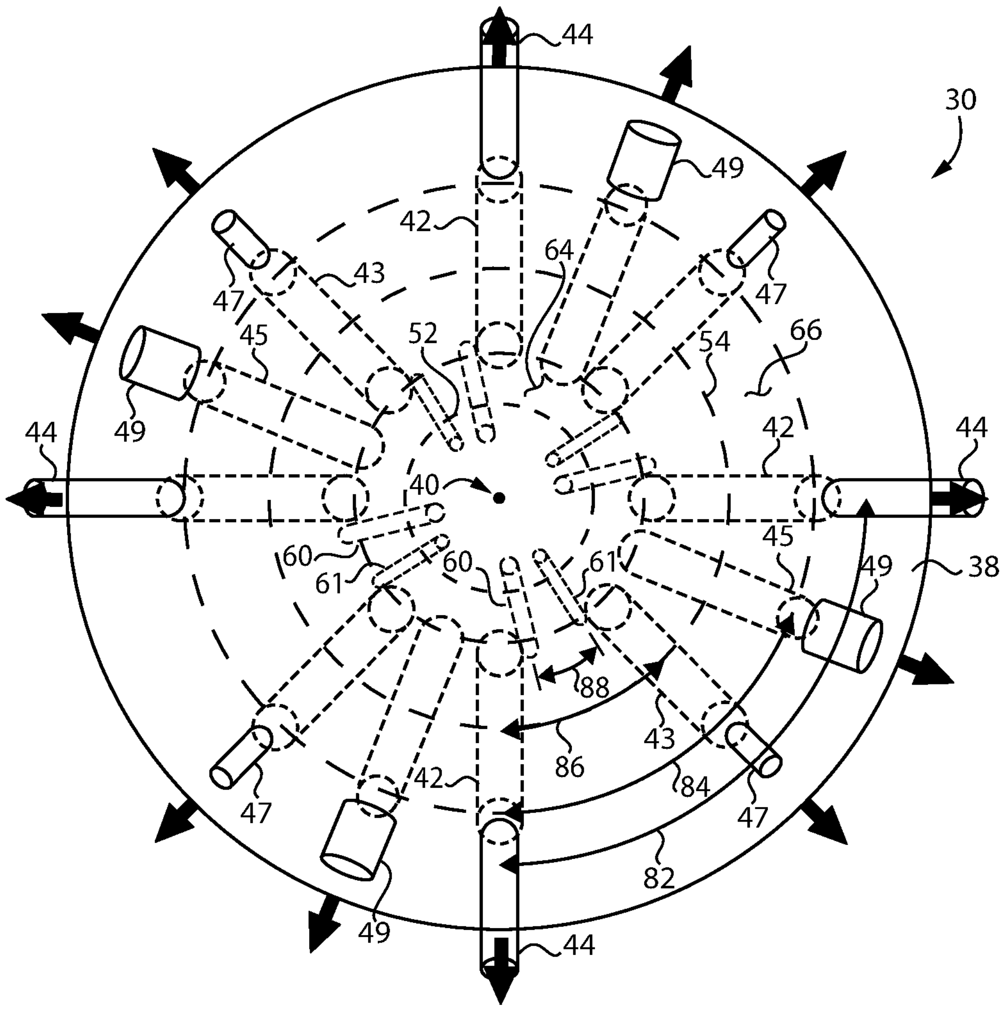
FIG. 6 is a diagrammatic end view of a fuel injector nozzle assembly as in FIGS. 3-5.

Referring also now to FIG. 6, there is shown an end view diagrammatically illustrating additional features of nozzle assembly 30. From FIG. 6 it can be seen that spray ducts 44 are four in number and have a regular circumferential distribution about longitudinal axis 40, with each of ducts 44 spaced about 90° from one another. Ducts 47 are also four in number, having a circumferential distribution about 90° from one another about longitudinal axis 40. Ducts 49 are also circumferentially distributed, four in number, and about 90° apart. In the illustrated embodiment, ducts 44 are understood to have a radially symmetric circumferential distribution, and ducts 47 understood to have a radially symmetric distribution in an alternating arrangement with ducts 44 around longitudinal axis 40. It can also be seen that transfer passages 60 (the first passage set) and transfer passages 61 (the second passage set) are in an alternating arrangement circumferentially around longitudinal axis 40. A number of transfer passages 60 and 61 in total may be equal to a number of spray orifices in first spray orifice set 42 and second spray orifice set 43. An angle 88 circumferentially around longitudinal axis 40 is defined by an angular spacing between one of transfer passages 60 and a closest adjacent one of transfer passages 61. Angle 88 may be less than 45°, and could be about 30° in one embodiment. It can also be observed that a passage-passage angular spacing defined by transfer passages 60 and transfer passages 61 is non-uniform about longitudinal axis 40. In FIG. 6 outer check 54 is at a third angular orientation, angularly between the first angular orientation as in FIG. 4 and the second angular orientation as in FIG. 5. At the third angular orientation, transfer passages 60 and transfer passages 61 are blocked from all of the spray orifices formed in nozzle case 38. The configuration shown in FIG. 6 might be used when outer check 54 is retracted to simultaneously spray fuel out of all of spray ducts 44, 47, and 49, as might be used when an associated engine is operated at a rated condition or during certain transients. It will be appreciated that outer check 54 can be rotated about longitudinal axis 40 from the angular orientation shown in FIG. 6 to the first angular orientation or the second angular orientation to provide for injection out of the respective spray orifices and ducts. Another angle 86 is defined between adjacent spray orifices 42 and 43. A third angle 84 is defined between spray orifices 42 and 45, and a fourth angle 82 is defined between same-set spray orifices 42 that are adjacent. Angle 82 is about 90° in the illustrated embodiment. Angle 84 is about 60° in the illustrated embodiment. Angle 86 is about 45° in the illustrated embodiment.

Figure 7:
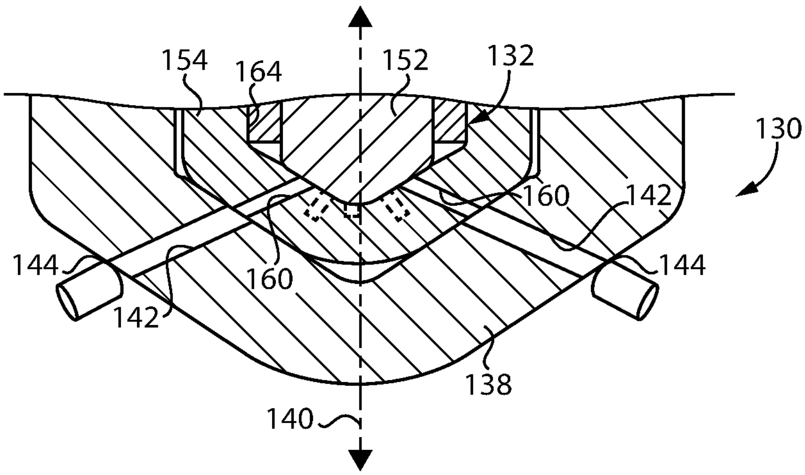
FIG. 7 is a sectioned side diagrammatic view of a fuel injector nozzle assembly according to another embodiment in one configuration.
Figure 8:
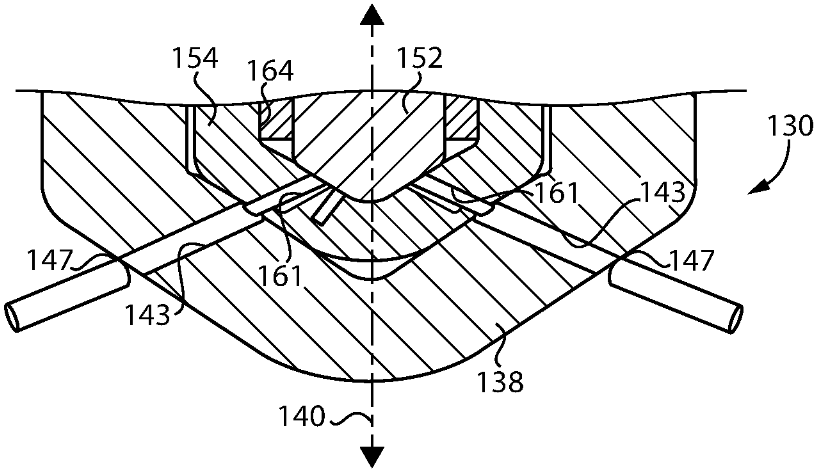
FIG. 8 is a sectioned side diagrammatic view of the nozzle assembly of FIG. 7 in another configuration.

Referring now to FIG. 7 and FIG. 8, there is shown a fuel injector nozzle assembly 130 according to another embodiment. Nozzle assembly 130 includes a nozzle case 138 and a concentric check assembly 132 within nozzle case 138. An inner check 152 operable analogously to inner check 52 discussed above, can be advanced and retracted relative to an outer check 154 to fluidly connect a fuel volume 164 to a first set of transfer passages 160 and a second set of transfer passages 161. In FIG. 7 outer check 154 is at a first angular orientation where first set of transfer passages 160 are fluidly connected to a first set of spray orifices 142. A first set of spray ducts 144 are in spray path alignment with spray orifices 142. In FIG. 8 outer check 154 has been rotated from the first angular orientation about longitudinal axis 140 to a second angular orientation. At the second angular orientation, a second set of transfer passages 161 is fluidly connected to a second set of spray orifices 143. A second set of spray ducts 147 are in spray path alignment with spray orifices 143. First set of spray ducts 144 and second set of spray ducts 147 may differ from one another in at least one of duct number, duct length, duct width, duct shape, or spray angle. It will be recalled that nozzle assemblies according to the present disclosure can be equipped with unducted spray orifices in some embodiments. Unducted spray orifices may differ in any of these same or analogous properties relative to spray ducts in a nozzle assembly.

Figure 9:
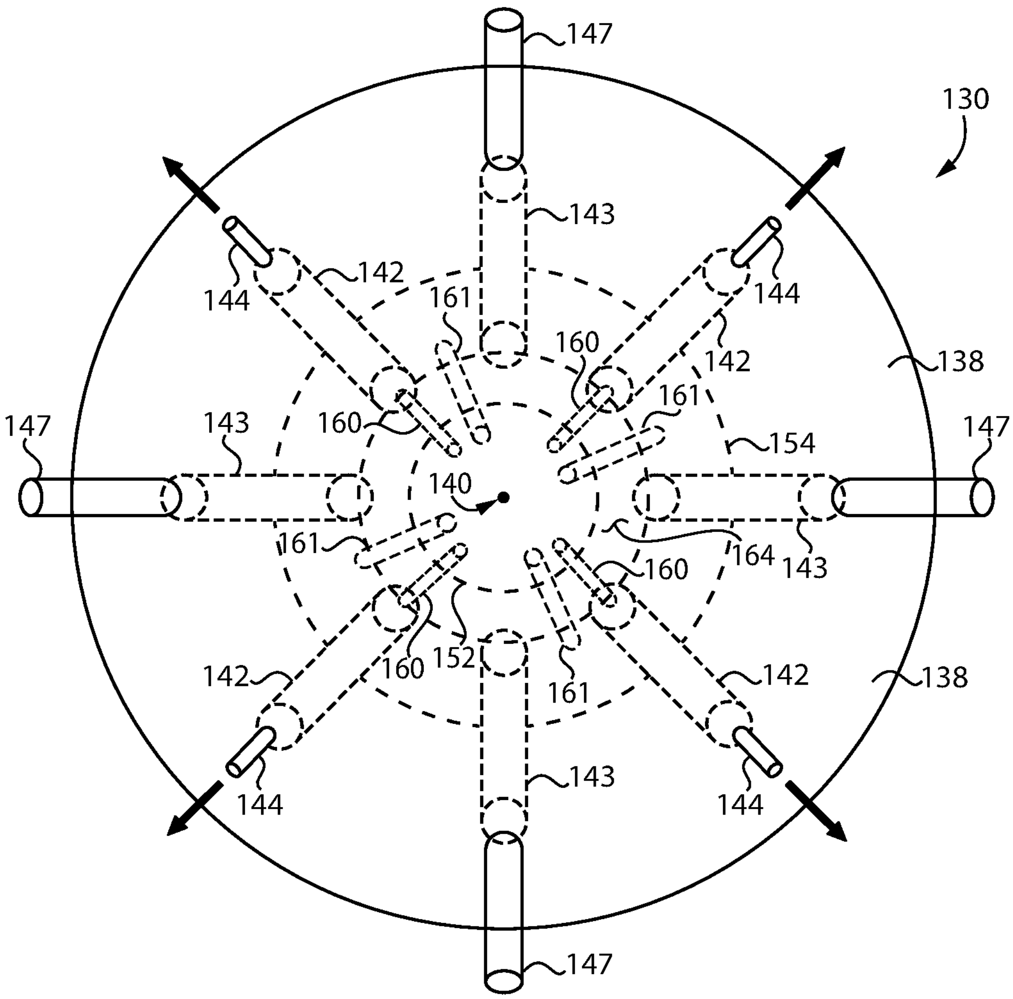
FIG. 9 is a diagrammatic end view of the fuel injector nozzle assembly as in FIGS. 7 and 8.

Referring now to FIG. 9, there is shown an end view of nozzle assembly 130. From FIG. 9 it can be seen that first set of spray ducts 147 have a circumferential distribution around longitudinal axis 140, are four in number, and regularly spaced at about 90°. Spray ducts 144 are analogously distributed, and rotated about 45° relative to locations of first set of spray ducts 147. First set of transfer passages 160 and second set of transfer passages 161 may each have a radially symmetric distribution, in an alternating pattern with one another much like the transfer passage configurations in the preceding embodiment.

Figure 10:
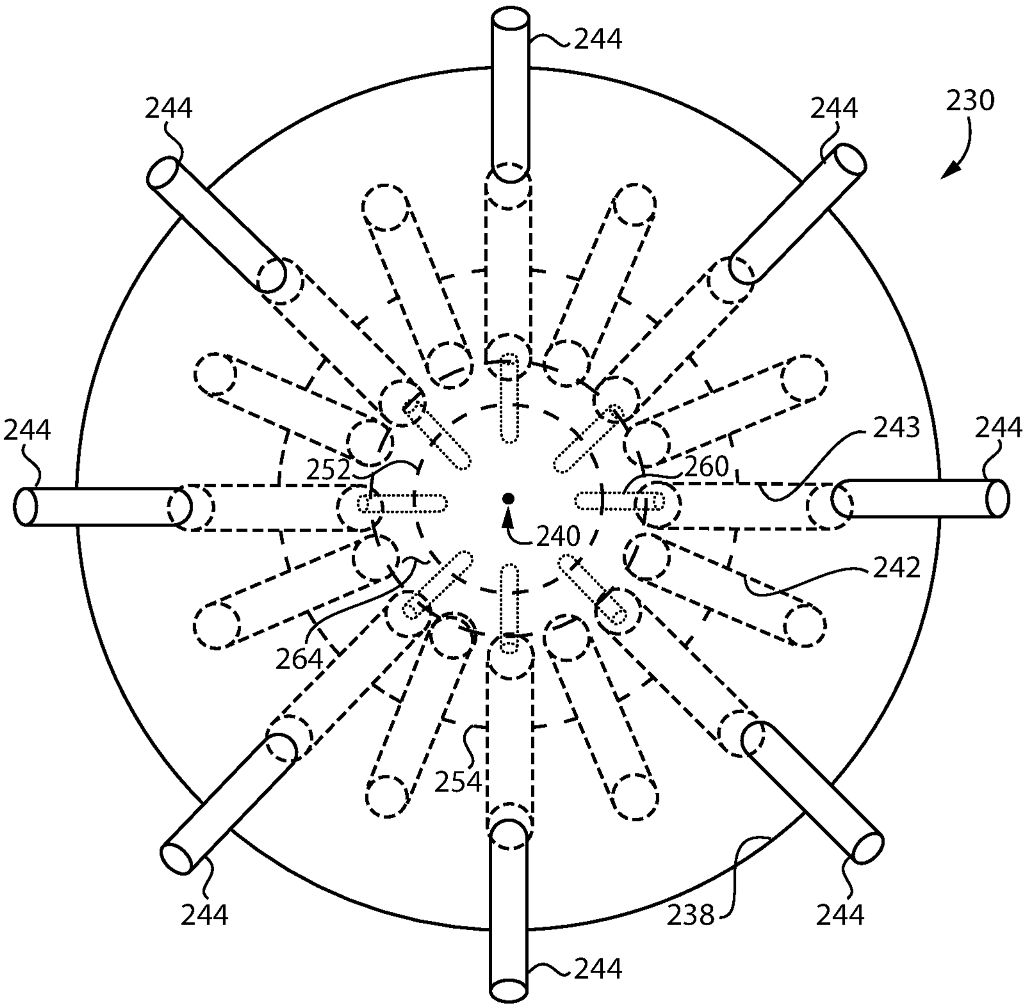
FIG. 10 is a diagrammatic end view of the fuel injector nozzle assembly, according to another embodiment.

Turning now to FIG. 10 there is shown another fuel injector nozzle assembly 230 according to another embodiment. Nozzle assembly 230 includes a nozzle case 238, and an inner check 252 and an outer check 254 in a coaxial check arrangement analogous to the foregoing embodiments. Nozzle case 238 defines a longitudinal axis 240. In contrast to foregoing embodiments, nozzle assembly 230 is configured with only one set of transfer passages 260, and one set of spray ducts 244. Spray ducts 244 may be in spray path alignment with a first set of spray orifices 243. Spray orifices 243 are in an alternating arrangement in the illustrated embodiment with a second set of spray orifices 242 that are unducted. Outer check 254 may be rotated relative to nozzle case 238 about longitudinal axis 240 from a first angular orientation where transfer passages 260 fluidly connect a fuel volume 264 to spray orifices 243, and a second angular orientation where transfer passages 260 fluidly connect fuel volume 264 to spray orifices 242. It will thus be appreciated that while transfer passages in other embodiments may be arranged in different sets that are purpose designed for feeding fuel to only some of the spray orifices in a nozzle assembly, in the embodiment of FIG. 10 the same transfer passages 260 are used, at different angular orientations of outer check 254, to supply fuel to ducted and also unducted spray orifices. A number of the ducted spray orifices 243 and unducted spray orifices 242 is equal in nozzle assembly 230. In an alternative embodiment a number of ducted spray orifices may be different from the number of unducted spray orifices. For example, modifying nozzle assembly 230 to remove every other one of spray orifices 243, and the associated ducts 244, would enable outer check 254 to be rotated between a first angular orientation where transfer passages 260 all feed fuel to spray orifices, and a second angular orientation where only one half of transfer passages 260 feed fuel to ducted transfer passages and the other half are blocked. Still another version could selectively remove unducted spray orifices, to provide a number of ducted orifices that is greater than a number of unducted orifices.

INDUSTRIAL APPLICABILITY

Referring to the drawings generally, operating fuel injector 28 in internal combustion engine 10 can include pressurizing fuel using fuel system 20 and supplying the pressurized fuel to fuel injector 28 such that fuel volume 64, and second fuel volume 66 where provided, store the pressurized fuel in anticipation of injection. Outer check 54 may be positioned, such as by rotating outer check 54 about longitudinal axis 40 to a first angular orientation where a first set of transfer passages, for example, transfer passages 60, in outer check 54 are fluidly connected to a first set of spray orifices, for example, spray orifices 42, in nozzle case 38. With outer check 54 at the first angular orientation, inner check 52 may be retracted to fluidly connect transfer passages 60 to fuel volume 64. The provision of pressurized fuel to transfer passages 60 results in a spray of fuel from fuel injector 28 through spray orifices 42 and through spray ducts 44. Inner check 52 may be moved back to its advanced position to end fuel injection. When it is desirable to inject fuel through a different set of spray ducts, or through unducted spray orifices, outer check 54 is rotated to a second angular orientation where a second set of transfer passages, such as transfer passages 61, in outer check 54 are fluidly connected to a second set of spray orifices, such as spray orifices 43, in nozzle case 38. Inner check 52 is again retracted to now fluidly connect transfer passages 61 to fuel volume 64, and based on the fluidly connecting of transfer passages 61 to fuel volume 64, fuel is sprayed from fuel injector 28 through spray orifices 43 and spray ducts 47.

As also described herein, in some instances it may be desirable to inject fuel through a third set of spray orifices and a third set of spray ducts. Outer check 54 may be retracted to fluidly connect a third set of spray orifices, such as spray orifices 45, to second fuel volume 66. Retracting outer check 54 may fluidly connect all of the spray orifices in nozzle case 38 to second fuel volume 66. In some embodiments, rotating outer check 54 from the first angular orientation to the second angular orientation could include rotating outer check 54 less than 90°, and potentially less than 45°, about longitudinal axis 40 from the first angular orientation. It will be understood from FIG. 6, for example, that outer check 54 can be rotated approximately 45° to transition from the first angular orientation to the second angular orientation.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel injector comprising:

a nozzle case defining a longitudinal axis, and having a plurality of spray orifices formed therein arranged in a first orifice set and a second orifice set;

a plurality of spray ducts separate from, and coupled to, the nozzle case and in spray path alignment with the first orifice set, such that an axis of a fuel spray path exiting each respective one of the plurality of spray orifices in the first orifice set enters a different respective one of the plurality of spray ducts;

an outer check positioned within the nozzle case and having a plurality of transfer passages formed therein arranged in a first passage set and a second passage set, and the outer check is rotatable about the longitudinal axis relative to the nozzle case;

an inner check positioned within the outer check and movable relative to the outer check between a retracted position and an advanced position;

a fuel volume formed between the outer check and the inner check, and at the retracted position the transfer passages are fluidly connected to the fuel volume, and at the advanced position the inner check is in contact with the outer check and blocks the transfer passages from the fuel volume;

the spray orifices and the transfer passages together define a first angular alignment pattern where the outer check is at a first angular orientation about the longitudinal axis and the first orifice set is fluidly connected to the first passage set; and the spray orifices and the transfer passages together define a second angular alignment pattern where the outer check is rotated from the first angular orientation to a second angular orientation and the second orifice set is fluidly connected to the second passage set.

2. The fuel injector of claim 1 wherein the second passage set is blocked from the second orifice set in the first angular alignment pattern, and the first passage set is blocked from the first orifice set in the second angular alignment pattern.

3. The fuel injector of claim 2 wherein the first passage set and the second passage set are in an alternating arrangement circumferentially around the longitudinal axis and together define a passage-passage angular spacing that is non-uniform about the longitudinal axis.

4. The fuel injector of claim 1 further comprising a second set of spray ducts coupled to the nozzle case and in spray path alignment with the second set of spray orifices.

5. The fuel injector of claim 4 wherein a number of the spray orifices in total is greater than a number of the transfer passages in total.

6. The fuel injector of claim 4 wherein the first set of spray ducts and the second set of spray ducts differ from one another in at least one of duct number, duct length, duct width, duct shape, or spray angle.

7. The fuel injector of claim 1 further comprising a second fuel volume formed between the nozzle case and the outer check, and the outer check is movable relative to the nozzle case between a retracted position where the spray orifices are fluidly connected to the second fuel volume, and an advanced position where the outer check is in contact with the nozzle case and the spray orifices are blocked from the second fuel volume.

8. The fuel injector of claim 7 wherein the spray orifices are arranged in a third orifice set, and the third orifice set is blocked from the fuel volume formed between the outer check and the inner check in both the first angular alignment pattern and the second angular alignment pattern.

9. The fuel injector of claim 1 wherein the outer check is movable relative to the nozzle case between a retracted position, and an advanced position, and further comprising a first actuator structured to actuate the inner check, and a second actuator structured to actuate the outer check.

10. A fuel injector comprising:

a nozzle case defining a longitudinal axis, and having spray orifices formed therein arranged in a first orifice set and a second orifice set;

spray ducts coupled to the nozzle case and in spray path alignment with the first orifice set;

an outer check positioned within the nozzle case and having transfer passages formed therein arranged in a first passage set and a second passage set, and the outer check is rotatable about the longitudinal axis relative to the nozzle case;

an inner check positioned within the outer check and movable relative to the outer check between a retracted position and an advanced position;

a fuel volume formed between the outer check and the inner check, and at the retracted position the transfer passages are fluidly connected to the fuel volume, and at the advanced position the inner check is in contact with the outer check and blocks the transfer passages from the fuel volume;

the spray orifices and the transfer passages together define a first angular alignment pattern where the outer check is at a first angular orientation about the longitudinal axis and the first orifice set is fluidly connected to the first passage set;

the spray orifices and the transfer passages together define a second angular alignment pattern where the outer check is rotated from the first angular orientation to a second angular orientation and the second orifice set is fluidly connected to the second passage set; and a second fuel volume formed between the nozzle case and the outer check, and the outer check is movable relative to the nozzle case between a retracted position where the spray orifices are fluidly connected to the second fuel volume, and an advanced position where the outer check is in contact with the nozzle case and the spray orifices are blocked from the second fuel volume.

11. The fuel injector of claim 10 wherein the spray orifices are arranged in a third orifice set, and the third orifice set is blocked from the fuel volume formed between the outer check and the inner check in both the first angular alignment pattern and the second angular alignment pattern.

12. The fuel injector of claim 10 further comprising a second set of spray ducts coupled to the nozzle case and in spray path alignment with the second set of spray orifices.

13. The fuel injector of claim 10 wherein the first set of spray ducts and the second set of spray ducts differ from one another in at least one of duct number, duct length, duct width, duct shape, or spray angle.

14. The fuel injector of claim 10 wherein the second passage set is blocked from the second orifice set in the first angular alignment pattern, and the first passage set is blocked from the first orifice set in the second angular alignment pattern.

* * * * *